United States Patent Office 3,839,420
Patented Oct. 1, 1974

3,839,420
16,17-SECO-Δ⁴ AND Δ⁵⁽¹⁰⁾ STEROIDS
Pierre Crabbe, Mexico, Mexico, and John A. Edwards and John H. Fried, Palo Alto, Calif., assignors to Syntex (U.S.A.) Inc.
No Drawing. Filed May 12, 1971, Ser. No. 142,763
Int. Cl. C07c 171/07
U.S. Cl. 260—488 B         20 Claims

ABSTRACT OF THE DISCLOSURE

New 16,17-seco-steroidal compounds of the estrane and gonane series, unsaturated at C-4,5 or C-5(10), and the 14β-isomers thereof, useful as antiandrogenic agents, and methods for their preparation.

---

The present invention relates to novel polyhydrophenanthrene derivatives and processes and intermediates useful for the synthesis thereof.

More particularly, this invention relates to certain novel 16,17-seco steroids of the estrane and gonane series, represented by the following formulas:

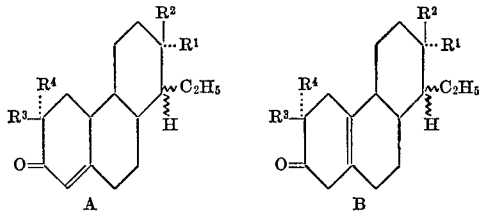

A          B wherein $R^1$ represents lower alkyl or a hydroxylated hydrocarbon radical represented by the formulas:

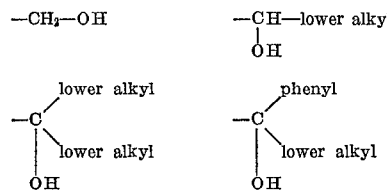

and the corresponding conventionally hydrolyzable esters and ethers thereof;

$R^2$ represents lower alkyl;
$R^3$ and $R^4$ represents hydrogen or methyl, provided that $R^4$ is methyl when $R^3$ is methyl.

These compounds have asymmetric carbon atoms and the various steroisomers are included within the scope of this invention.

The term "lower alkyl" as used herein refers to straight or branched alkyl groups containing up to 4 carbon atoms, e.g. methyl, ethyl, n-propyl, isopropyl, n-butyl, and the like.

The term "conventional hydrolyzable esters and ethers" as used herein refers to hydrolyzable carboxylic ester and ether groups known conventionally in the art. These hydrolyzable carboxylic esters are derived from both substituted and unsubstituted hydrocarbon carboxylic acids. These acids can be completely saturated or possess varying degrees of unsaturation (including aromatic), can be of straight chain, branched chain, or cyclic structure, and preferably contain from 1 to 12 carbon atoms. In addition, they can be substituted by functional groups, for example, hydroxy, alkoxy containing up to six carbon atoms, acyloxy containing up to 12 carbon atoms, nitro, amino, halogeno, and the like, attached to the hydrocarbon backbone chain. Typical ester groups include acetate, propionate, butyrate, trimethylacetate, valerate, methylethylacetate, caproate, t-butylacetate, 3-methylpentanoate, enanthate, caprylate, trimethylacetate, pelargonate, decanoate, undecenoate, benzoate, phenylacetate, diphenylacetate, cyclopentylpropionate, methoxyacetate, aminoacetate, diethylaminoacetate, trichloroacetate, β-chloropropionate bicyclo-[2.2.2]-octane-1'-carboxylate, adamantoate, and the like. Typical ether groups are methyl ether, ethyl ether, cyclopentyl ether, cyclohexyl ether, propyl ether, tetrahydropyran-2'-yl ether, tetrahydrofuran-2'-yl ether, 4'-methoxytetrahydropyran-4'-yl ether, propyl ether, and the like.

The compounds of the present invention are valuable pharmaceutical agents possessing anti-androgenic activity. They are of particular utility for the treatment of hyper-androgenic conditions such as acne, prostatic hypertrophy, hirsutism in the female, seborrheic dermatitis and the like.

The compounds of the present invention unsubstituted at C-2 (i.e., $R^3$ and $R^4$ groups) are obtained by a process illustrated by the following sequence of reactions:

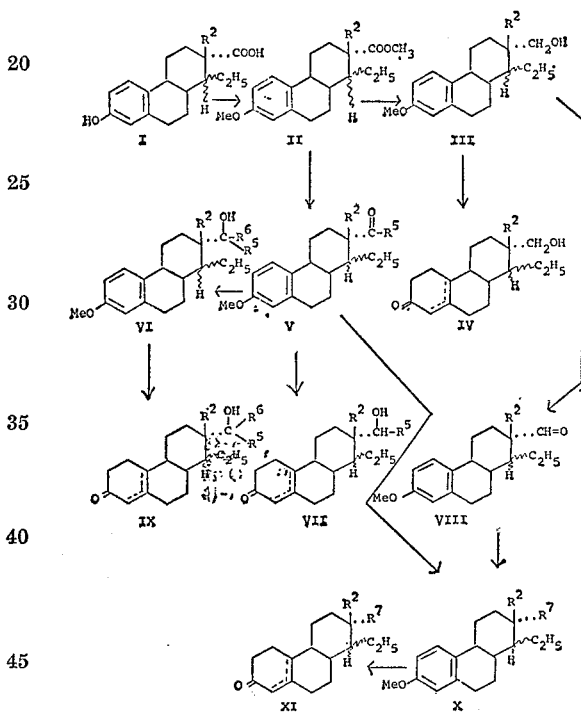

wherein $R^2$ has the above indicated meaning,
$R^5$ and $R^7$ represent a lower alkyl group and
$R^6$ represents a lower alkyl group or phenyl.

The dotted lines between positions C-4,5 and C-5(10) of the molecule indicate unsaturation in either of said positions. The wavy lines for the hydrogen atom and the ethyl group at C-14 indicate the α or β configuration (each and mixtures) for said substitution. Me is methyl.

In practicing the process illustrated above when applied to compounds having the natural configuration at C-14, 16,17-secoestra-1,3,5(10)-trien-3-ol-17-oic acid (I), or the corresponding 13-alkyl derivatives (gonatriene compounds), is converted into a 3-alkoxy-17-alkyl ester, particularly into the 3-methoxy-17-methylester (II) by reaction with dialkyl sulfate, e.g. dimethylsulfate, in a strong alkaline medium, e.g. in the presence of potassium hydroxide, using a lower alcohol such as methanol as solvent. Reduction of the latter compound (II) with a double metal hydride, using particularly lithium aluminum hydride, affords 3-methoxy-16,17-secoestra-1,3,5-(10)-trien-17-ol or the corresponding 16,17-secogonatriene (both III), which is reduced with lithium in liquid ammonia to the 3-methoxy-2,5(10)-diene intermediate. Mild hydrolysis of the diene with a weak acid such as oxalic acid in aqueous methanolic solution, at room temperature, gives rise to the 16,17-secoestr-5(10)-en-17-ol-3-one (IV; double bond at C–5(10)). When the hydrolysis of the 2,5(10-diene intermediate is carried out using a strong acid such as hydrochloric acid, either at room temperature or under refluxing conditions, the corresponding $\Delta^4$-3-keto compound is obtained, i.e., 16,17-secoestr-4-en-17-ol-3-one and 16,17-seco-13-alkylgon-4-en-17-ol-3-one (IV, double bond at C–4).

By reaction of a 3-methoxy-16,17-secoestra-1,3,5(10)-trien-17-oic acid methyl ester (II) with an excess of a lower alkyl magnesium halide such as methylmagnesium bromide, ethylmagnesium bromide, isopropyl magnesium bromide and the like in an inert organic solvent at reflux temperature for a prolonged period of time of the order of 15 to 24 hours, the corresponding 3-methoxy-17-keto-17-alkyl-16,17-secoestra-1,3,5(10)-triene compound (V) is produced in mixture with the 3-methoxy-17-hydroxy-17-dialkyl compound (VI, $R^6$=lower alkyl).

When a 3 - methoxy-17-keto-17-alkyl-16,17-secoestra-1,3,5(10)-triene (V) is treated with phenyl lithium in tetrahydrofuran solution or with phenylmagnesium bromide in ether solution, at reflux temperature, there is obtained the 3 - methoxy-17-hydroxy-17-alkyl-17-phenyl-16,17-secoestra-1,3,5(10)-triene (VI, $R^6$=phenyl).

Reduction of the 17-keto compounds of formula V with an alkali metal such as lithium, sodium or potassium in liquid ammonia followed by mild hydroylsis of the $\Delta^{2,5(10)}$ diene produced, i.e., using oxalic acid in aqueous methanol produces the corresponding 17-hydroxy-17-alkyl-16,17 - secoestr-5(10)-en-3-one compound (VII, double bond at C–5(10)). When the hydrolysis of the diene intermediate is carried out with a strong mineral acid, e.g., with methanolic hydrochloric acid the corresponding 17-hydroxy-17-alkyl-16,17-secoestr-4-en-3-one is produced (VII, double bond at C–4,5).

Similarly, by reduction of the 17-trisubstituted compounds of formula VI with an alkali metal in liquid ammonia followed by hydrolysis with either oxalic acid or hydrochloric acid the corresponding 17-hydroxy-17-dialkyl-$\Delta^{5(10)}$- and 17 - hydroxy-17-dialkyl-$\Delta^4$-estren-3-keto compounds as well as the 17-hydroxy-17-alkyl-17-phenyl substituted derivatives thereof (IX) are produced.

Oxidation of a compound of formula III, i.e., a 16,17-seco-17-hydroxylated compound with chromium trioxide under conventional conditions, and preferably using an 8N solution of chromic acid in acetone and in the presence of sulfuric acid (Jones reagent) gives rise to the corresponding 3-methoxy-16,17-secoestra-1,3,5(10)-trien-17-al (VIII), which is then submitted to reduction of the aldehyde group by electrochemical methods to the corresponding 17-unsubstituted compound (X, $R^7$=methyl). This reduction is effected at the cathode of a divided electrolysis cell in an electrolytic medium comprising a mineral acid electrolyte, water and a water miscible inert organic solvent, at a current density of about 0.2 to about 0.8 amps/cm.² and at a temperature of from about 0° C. to about 70° C. for a period of about 1 to about 16 hours. Mineral acids suitable for the electrolytic medium are sulfuric acid, hydrochloric acid, perchloric acid, hydrobromic acid, phosphoric acid, and the like; preferably, sulfuric acid or perchloric acid. Water-miscible organic solvents inert to the electrolysis reaction suitable for the electrolytic medium are ethers such as dioxane, tetrahydrofuran and the like, lower monohydric alcohols such as methanol, ethanol, and the like, lower alkylene glycols such as ethyl glycol, propylene glycol, and the like, mixtures of the foregoing solvents, and the like in which the aldehyde is soluble or substantially soluble.

The amount of solvent present in the electrolytic medium can range from that amount which is sufficient to dissolve or substantially dissolve the aldehyde up to about 94%, preferably from about 20% to about 85% by weight, of the total electrolytic medium. The amount of acid in the medium can range from about 1% to about 20%, by weight, of the total electrolytic medium, preferably from about 2% to about 15%. The amount of water in the medium should be at least 5% by weight of the total electrolytic medium, preferably from about 10% to about 75%. A preferred medium is an equal volume of the inert organic solvent and an equal volume of 10% to 30% aqueous sulfuric acid, by weight.

Cathode materials useful in the process of the electrochemical reduction include the high hydrogen overvoltage materials such as lead, cadmium, mercury, and the like. The cathode may be in any number of physical forms but preferably in a form having a high surface such as a sheet or a wire mesh which is sufficiently rigid to be used as a stirring means. Anode materials useful for this reduction are difficultly oxidizable conductors such as carbon, platinum, iron, lead, and the like. In general, the anode material may be any conductor which is not attacked by the electrolytic medium in a manner which would transform it into a soluble state over a short period.

Alternatively, the reduction can be carried out by chemical methods, for example by treatment with benzyl mercaptan followed by desulfurization with Raney nickel.

The 17-unsubstituted compound is then converted into 16,17 - secoestr-5(10)-en-3-one or 16,17-secoestr-4-en-3-one (XI, $R^7$=methyl) by the above described reduction and hydrolysis methods.

Similarly, electrochemical or chemical carbonyl reduction of a 3-methoxy-17-keto-17-alkyl-16,17-secoestra-1,3,5(10)-triene compound of formula V, e.g. 3-methoxy-17-keto-17-methyl-16,17-secoestra-1,3,5(10)-triene produces the corresponding compounds substituted at C–17 by alkyl group e.g., 3-methoxy-17-methyl-16,17-secoestra-1,3,5(10)-triene, compounds of formula X ($R^7$=alkyl of 2 to 4 carbon atoms) which in turn are reduced with an alkali metal in liquid ammonia, and the 2,5(10)-diene intermediate hydrolyzed with either oxalic acid or hydrochloric acid to afford the corresponding 17-alkyl-16,17-secoestr-5(10)-en-3-one or 17-alkyl-16,17-secoestr-4-en-3-one, e.g. 17-ethyl-16,17-secoestr-5(10)-en-3-one and 17-ethyl-16,17-secoestr-4-en-3-one (XI, $R^7$=alkyl of 2 to 4 carbon atoms). Chemical carboxyl reduction of a compound of formula V can be accomplished by, for example, a Wolff-Kishner reduction, a Clemmensen reduction, or thioketal formation followed by treatment with Raney nickel.

The compounds possessing hydroxyl groups (formulas IV and VII and the $\Delta^4$ compounds of formula IX) can be esterified or etherified following the conventional esterification and etherification methods known to the skilled in the art, i.e., esterification, with subsequent hydrolysis work-up, using an acid anhydride or acid chloride in pyridine solution for the esterification of primary and secondary hydroxyl groups and with carboxylic acid anhydrides in benzene solution and in the presence of an acid catalyst such as p-toluenesulfonic acid or with a mixture of a carboxylic acid-carboxylic anhydride in the presence of an acid catalyst for the $\Delta^4$-3-keto compounds having tertiary hydroxyl groups. The $\Delta^{5(10)}$ compounds of formula IX are esterified by a method comprising reduction of the keto function with a double metal hydride, diesterification with a mixture of carboxylic acid-carboxylic anhydride in the presence of an acid catalyst, selective saponification at C–3 with sodium carbonate and oxidation of the hydroxyl group with chromic acid.

Etherification is also carried out by conventional techniques. Thus, reaction with dihydropyran, dihydrofuran or 4-methoxy-5,6-dihydro-2H-pyran in an inert solvent as benzene and in the presence of an acid catalyst produces the tetrahydropyran-2′-yloxy, tetrahydrofuran-2′ - yloxy, or 4-methoxytetrahydropyran-4′-yloxy derivatives, respectively. Methyl, ethyl and cyclopentyl ethers, for example, are prepared upon reaction of the hydroxy compound with sodium hydride and methyl iodide, ethyl iodide and cyclopentyl bromide, respectively.

Compounds of formula IV can be converted into the corresponding acids by oxidation with chromium trioxide, and the acids can be esterified by conventional methods, such as treatment with an excess of a diazoalkane such as diazomethane or diazoethane in ether solution.

Compounds of formula VII can also be oxidized to the corresponding 17-keto derivatives by reaction with chromium trioxide in pyridine to thus produce the corresponding 3,17-diketo-17-alkyl-16,17-secoestr-5(10)-enes, or 3, 17-diketo-17-alkyl-16,17-secoestr-4-enes. Alternatively, the oxidation of $\Delta^4$-3-keto compounds can be effected using chromic acid in aqueous acetic acid solution or with an 8N chromic acid solution in acetone (Jones reagent).

When the reactions described hereinbefore (II→XI) are effected using 3-methoxy-16,17-seco-14$\beta$ - estra - 1,3, 5(10)-trien-17-oic acid methyl ester or the corresponding 14$\beta$-gonatriene derivatives as starting materials, there are produced the 14$\beta$-isomers thereof.

16,17-secoestra-1,3,5(10)-trien-3-ol-17-oic acid is also known as *trans* doisynolic acid (see, for example Fieser and Fieser Steroids N.Y., Reinhold 1959, pp. 489, 491, and 494). This compound is obtained by alkaline fusion of estrone or estradiol. The corresponding gonatriene compounds are obtained in a similar manner from the 13-alkyl derivatives of estradiol.

3-Methoxy-16,17-seco-14$\beta$-estra-1,3,5(10)-trien - 3 - ol-17-oic acid-methyl ester and the 13-alkyl derivatives thereof are obtained from 14-isoestrone by the process illustrated by the following scheme:

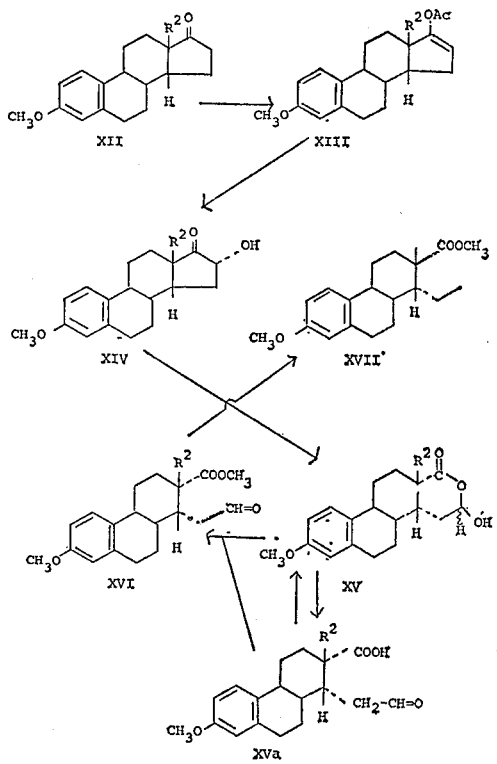

In practicing the process outlines above, 3-methoxy-14-isoestrone or a 13-alkyl derivative thereof (XII), obtained as decribed in U.S. Pat. 3,374,228, is converted into the corresponding enol acetate (XIII) by reaction with isopropenyl acetate in the presence of an acid catalyst such as p-toluenesulfonic acid, at reflux temperature for a period of time of about 10 to about 24 hours. The 3-methoxy-17-acetoxyestra-1,3,5(10),16-tetraene thus obtained is then treated with osmium tetroxide in pyridine solution, at room temperature for a prolonged period of time, of the order of 40 to 70 hours followed by decomposition of the osmate ester with sodium bisulfite, to give the 16$\alpha$-hydroxy-3-methoxyestra-1,3,5(10)-trien - 17 - one derivative (XIV). Alternatively, this compound can be obtained by epoxidation of compound XIII with a peracid such as m-chloroperbenzoic acid, monoperphthalic acid or perbenzoic acid followed by reaction of the 16$\alpha$,17$\alpha$-epoxide thus obtained with a strong mineral acid, e.g. sulfuric acid in methanol solution, at room temperature for a period of time of the order of 10 to 20 hours. Upon reaction of 16$\alpha$-hydroxy-14$\beta$-estrone-3-methyl ether or a 13-alkyl derivative thereof with periodic acid in aqueous pyridine solution, at room temperature there is produced the corresponding lactol of formula XV, in equilibrium with the acid aldehyde XVa. In this reaction it is recommended to use the stoichiometric amount of periodic acid, or a slight excess, i.e. no more than 1.2 molar equivalents, otherwise the yields of the lactol are lower.

Treatment of the lactol XV with an excess of an ethereal solution of diazomethane or with methyl iodide in methanol gives rise to 3-methoxy-16,17-seco-14$\beta$-estra-1,3,5(10) - trien - 16 - aldehyde-17-oic acid methyl ester (XVI) which is reduced by chemical or electrochemical methods to 3 - methoxy - 16,17-seco-14$\beta$-estra-1,3,5(10)-trien-17-oic acid methyl ester or the corresponding gonatriene compound (XVII). Particularly, the elimination of the aldehyde group is carried out by converting a compound of formula XVI into the benzylthio acetal upon reaction with benzyl mercaptan in ether and in the presence of boron trifluoride etherate, at room temperature for a period of time of the order of about 16 to about 24 hours followed by reflux with Raney nickel.

As previously mentioned, compounds of formula XVII are then elaborated in accordance with the methods described hereinbefore for the compounds with natural configuration at C–14 (II → XI).

The 2$\alpha$-monomethyl and 2,2-dimethyl derivatives of the $\Delta^4$-3-keto compounds, as well as the 14$\beta$ isomers thereof are obtained by reaction of the $\Delta^4$ compounds of formulas IV, VII, IX, and XI with a methyl halide such as methyl iodide in the presence of potassium t-butoxide using a mixture of toluene-hexamethyl phosphoramide as solvent. The reaction is carried out at a temperature below 0° C. and preferably between —10° C. to —70° C., adding a solution of potassium t-butoxide in t-butanol to a previously cooled mixture of the steroid and methyl iodide in toluene-hexamethylphosphoramide.

The reaction mixture is maintained at said temperature for a period of time of between 30 minutes and several hours, preferably between 4 and 6 hours, isolating the product by conventional techniques such as dilution with water, separation of the organic phase and evaporation of the solvents under reduced pressure, or by steam distillation of the solvents followed by extraction of the product with an organic solvent non miscible with water such as ethyl acetate or methylene chloride.

The reaction prepares both the 2$\alpha$-monomethyl and 2,2-dimethyl compounds which can be separated and isolated via conventional methods, such as chromatography. The corresponding 2$\alpha$-monomethyl and 2,2-dimethyl compounds in the $\Delta^{5(10)}$ series are prepared by converting the 3-keto-$\Delta^4$ compounds to the $\Delta^{5(10)}$-3-ketal followed by hydrolysis, such as with oxalic acid to furnish the 3-keto-$\Delta^{5(10)}$ compounds.

The 17-hydroxyl group in compounds of formulas IV, VII, and IX will be etherified under the above described conditions therefore, it is recommended to protect said hydroxyl group by formation of an ester or tetrahydropyranylether prior to the dimethylation reaction, hydrolyzing these protecting groups afterwards by conventional techniques, well known to the skilled in the art.

The following examples serve to illustrate but are not intended to limit the scope of the present invention.

PREPARATION 1

A mixture of 300 g. of potassium hydroxide and 45 ml. of water is heated to 260° C. in a nickel crucible, 10 g. of estradiol are added and the temperature is then raised to 290–300° C., maintaining this temperature during 45 minutes. At the end of this time the foaming mass formed is allowed to cool to room temperature, water is added and the reaction mixture let stand at said temperature overnight so the excess of potassium hydroxide dissolves. The aqueous solution is filtered through Celite (diatomaceous earth) and the filtrate is made acidic by the addition of an excess of concentrated hydrochloric acid. The precipitate which forms is collected by filtration, washed with water and air dried, to produce 16,17-secoestra-1,3,5(10)-trien-3-ol-17-oic acid (trans doisynolic acid).

By the same method, starting from 18-methylestradiol, 18-ethylestradiol and 18-n-propylestradiol there are obtained 16,17 - seco-13-ethylgona-1,3,5(10)-trien-3-ol-17-oic acid, 16,17-seco-13-n-propylgona-1,3,5(10)-trien-3-ol-17-oic acid and 16,17-seco-13-n-butylgona-1,3,5(10)-trien-3-ol-17-oic acid.

Example 1

A solution of 42 g. of 16,17-secoestra-1,3,5(10)-trien-3-ol-17-oic acid (*trans* doisynolic acid) in 400 ml. of ethanol is heated to 30–40° C. and treated in an alternative manner with 240 ml. of dimethylsulfate in 240 ml. of methanol and 40% aqueous potassium hydroxide solution, such a way that the pH of the reaction mixture is maintained alkaline.

After the addition, the reaction mixture is stirred at the same temperature for 2 hours further, water is added and the product extract is washed with water to neutral, dried and evaporated to dryness. The solid residue is purified by filtration through 210 g. of Florisil, using hexane as eluant, thus yielding 3 - methoxy - 16,17 - secoestra-1,3,5(10)-trien-17-oic acid methyl ester.

A solution of 18 g. of 3-methoxy-17-carbomethoxy-16,17-secoestra-1,3,5(10)-triene in 200 ml. of anhydrous tetrahydrofuran is added dropwise, under stirring to 18 g. of lithium aluminum hydride in 300 ml. of anhydrous tetrahydrofuran and the reaction mixture is refluxed for 3 hours. The reaction mixture is then cooled and the excess reagent destroyed by careful addition of saturated solution of sodium sulfate and solid sodium sulfate. The resulting mixture is filtered through Celite diatomaceous earth and the filtrate extracted several times with methylene chloride; the combined organic extracts are washed to neutral, dried over sodium sulfate and evaporated to dryness. Chromatography of the residue on silica gel, using hexane:ethyl acetate (60:40) as eluant affords 3-methoxy-16,17-secoestra-1,3,5(10)-trien-17-ol.

In a similar manner, starting from 13-ethyl-16,17-secogona-1,3,5(10)-trien-3-ol-18-oic acid and 13-n-propyl 16,17-secogona-1,3,5(10)-trien-3-ol-17-oic acid there are obtained as final products 3-methoxy-13-ethyl-16,17-secogona-1,3,5(10)-trien-17-ol and 3-methoxy-13-n-propyl-16,17-secogona-1,3,5(10)-trien-17-ol respectively.

Example 2

A solution of 16.5 g. of 3-methoxy-16,17-secoestra-1,3,5(10)-trien-17-ol in 500 ml. of anhydrous tetrahydrofuran is added in a steady stream to 1.5 liters of liquid ammonia. To the resulting stirred solution are added 16.5 g. of lithium in portions, and the resulting blue solution is stirred for 1 hour further. Methanol is then added dropwise until the blue color is discharged and the ammonia is allowed to evaporate. The product is then extracted with ethyl acetate and the combined organic extracts washed with water to neutral, dried over sodium sulfate and evaporated to dryness under reduced pressure, to give 3-methoxy-16,17-secoestra-2,5(10)-dien-17-ol.

A mixture of 15 g. of 3-methoxy-16,17-secoestra-2,5(10)-dien-17-ol, 320 ml. of tetrahydrofuran, 350 ml. of methanol and 670 ml. of 6N hydrochloric acid is stirred at room temperature for 45 minutes. The reaction mixture is then poured into ice water and extracted with ethyl acetate. The organic extract is washed with water, sodium bicarbonate solution and water until neutral, dried over sodium sulfate and evaporated to dryness under vacuo. The residue is purified by t.l.c. to give the pure 16,17-secoestr-4-en-17-ol-3-one.

By using 3-methoxy-16,17-secoestra-1,3,5(10)-trien-17-oic acid in the above procedure, 16,17-secoestr-4-en-3-one-17-oic acid is prepared. This can be reduced to the 17-ol compound with 8N chromic trioxide in sulfuric acid. In addition, by use of the corresponding methyl ester starting compound, the 17-ol product is prepared directly.

In like manner, 3-methoxy-13-ethyl-16,17-secogona-1,3,5(10) - trien - 17 - ol and 3-methoxy-n-propyl-16,17-secogona-1,3,5(10)-trien-17-ol are converted successively into 3-methoxy-13-ethyl-16,17-secogona-2,5(10)-dien-17-ol and 13-ethyl-16,17-secogon-4-en-17-ol-3-one, and 3-methoxy - 13-n-propyl-16,17-secogona-2,5(10)-dien-17-ol and 13 - n - propyl - 16,17 - secogon - 4 - en-17-ol-3-one respectively.

Example 3

A solution of 16 g. of 3-methoxy-16,17-secoestra-1,3,5(10)-trien-17-oic acid methyl ester in 250 ml. of anhydrous tetrahydrofuran is treated with an excess (approximately 200 ml.) of 4N methylmagnesium bromide in ether and the mixture is refluxed with the exclusion of moisture for 18 hours. The cooled mixture is cautiously treated with excess aqueous ammonium chloride solution and the product isolated by extraction with methylene chloride. The extract is washed with water, dried over sodium sulfate and evaporated to dryness. The residue is purified by t.l.c. using a mixture of hexane:ethyl acetate (95:5) to produce 3-methoxy-17-methyl-16,17-secoestra-1,3,5(10) - trien - 17-one and 3-methoxy-17,17-dimethyl-16,17-secoestra-1,3,5(10)-trien-17-ol.

By the same method but using 3-methoxy-13-ethyl-16,17-secogona-1,3,5(10)-trien-17-oic acid methyl ester and 3 - methoxy-13-n-propyl-16,17-secogona-1,3,5(10)-trien-17-oic acid methyl ester as starting materials, there are obtained respectively 3-methoxy-13-ethyl-17-methyl-16,17-secogona-1,3,5(10)-trien-17-one and 3-methoxy-13-ethyl-17,17-dimethyl-16,17-secogona-1,3,5(10)-17-ol; and 3 - methoxy - 13 - n - propyl - 17-methyl-16,17-secogona-1,3,5(10)-trien-17-one and 3-methoxy-13-n-propyl-17,17-dimethyl-16,17-secogona-1,3,5(10)-trien-17-ol.

Example 4

A solution of 10 g. of 3-methoxy-16,17-secoestra-1,3,5(10)-trien-17-ol in 200 ml. of acetone distilled over potassium hydroxide is cooled to 10° C. and treated under an atmosphere of nitrogen and with stirring, with a solution of 8N chromic acid (prepared by mixing 26 g. of chromium trioxide with 23 ml. of concentrated sulfuric acid and diluting with water to 100 ml.), until the color of the reagent persisted in the mixture. It is stirred for 10 minutes further at the same temperature and diluted with sodium bisulfite solution and water. The product is then extracted with methylene chloride and the organic extract washed with water, dried over sodium sulfate and evaporated under vacuum, thus affording a crude product which upon recrystallization from acetone-hexane gives 3-methoxy-16,17-secoestra-1,3,5(10)-trien-17-al.

Into the cathode compartment of a divided electrolysis cell provided with a cellulose dialysis membrane, lead electrodes (each electrode measuring 2 cm. x 5 cm. x 1.6 mm.) and a stirrer, there is added 4.15 g. of 3-methoxy-16,17-secoestra-1,3,5(10)-trien-17-al and a mixture of 600 ml. of dioxane and 500 ml. of 10% aqueous sulfuric acid (by weight). To the anode compartment is added 40 ml. of the mixture of dioxane and 10% aqueous sulfuric acid. A current density of 0.8 amps./cm.$^2$ is applied for a period of six hours. The reaction mixture is then removed from the cell and concentrated under reduced pressure to a small volume which is then extracted several times with ether. The ether extracts are combined, washed with water and a 5% aqueous sodium bicarbonate solution, dried and evaporated to dryness to furnish 3-methoxy-16,17-secoestra-1,3,5(10)-triene.

The process of this example is repeated with the exception of using 3-methoxy-13-ethyl-16,17-secogona-1,3,5(10)-trien-17-ol and 3-methoxy-13-n-propyl-16,17-secogona-1,3,5(10)-trien-17-ol as starting materials, to yield as final products 3-methoxy-13-ethyl-16,17-secogona-1,3,5(10) - triene and 3 - methoxy-13-n-propyl-16,17-secogona-1,3,5(10)-triene, respectively.

In accordance with the electrochemical reduction set forth in the second paragraph of this example, 3-methoxy-17-methyl-16,17-secoestra-1,3,5(10)-trien-17-one and 3-methoxy-13-ethyl-17-methyl-16,17 - secogona - 1,3,5(10)-trien-17-one are converted into the corresponding desoxy compounds, namely 3-methoxy-17-methyl-16,17-secoestra-1,3,5(10)-triene and 3-methoxy-13-ethyl-17-methyl-16,17-secogona-1,3,5(10)-triene.

The 17-desoxy compounds obtained in this example are in turn reduced with lithium in liquid ammonia, in accordance with the method of Example 2, and the 3-methoxy-$\Delta^{2,5(10)}$-intermediates hydrolyzed with hydrochloric acid, as established in said example, thus obtaining: 16,17-secoestr-4-en-3-one, 13-ethyl-16,17-secogon-4 - en - 3-one, 13-n-propyl-16,17-secogon-4-en-3-one, 17-methyl-16,17-secoestr-4-en-3-one and 13-ethyl-17-methyl-16,17-secogon-4-en-3-one.

Example 5

A solution of 2 g. of 3-methoxy-17-methyl-16,17-secoestra-1,3,5(10)-trien-17-one in 250 ml. of anhydrous tetrahydrofuran is added dropwise to a solution of 10 molar equivalents of phenyl lithium in 150 ml. of ether with mechanical stirring and under an atmosphere of nitrogen. The mixture is then refluxed for 5 hours, cooled, poured into ice water and acidified with hydrochloric acid, stirring vigorously for 1 hour. The product is then extracted with methylene chloride and the organic extracts washed with water to neutral, dried over sodium sulfate and evaporated to dryness. Recrystallization of the residue from acetone-hexane yields 3-methoxy-17-methyl-17-phenyl-16,17-secoestra-1,3,5(10)-trien-17-ol.

In a similar manner, starting from 3-methoxy-13-ethyl-17-methyl-16,17-secogona-1,3,5(10)-trien-17-one and 3-methoxy-13-n-propyl-17-methyl-16,17 - secogona - 1,3,5(10)-trien-17-one the corresponding 17-phenyl-17-hydroxy compounds are obtained, namely 3-methoxy-13-ethyl-17-methyl-17-phenyl-16,17 - secogona - 1,3,5(10)-trien-17-ol and 3-methoxy-13-n-propyl-17 - methyl - 17-phenyl-16,17-secogona-1,3,5(10)-trien-17-ol.

Upon reduction of 3-methoxy-17-methyl-17-phenyl-16,17-secoestra-1,3,5(10)-trien-17-ol with lithium in liquid ammonia followed by hydrolysis of the $\Delta^{2,5(10)}$-diene intermediate with hydrochloric acid in accordance with the methods of Example 2, 17-methyl-17-phenyl-16,17-secoestr-4-en-17-ol-3-one is obtained.

Similarly, 3-methoxy-13-ethyl-17-methyl-17-phenyl-16,17-secogona-1,3,5(10)-trien-17-ol and 3-methoxy-13-n-propyl-17-methyl-17-phenyl-16,17 - secogona - 1,3,5(10)-trien-17-ol are converted respectively into 13-ethyl-17-methyl-17-phenyl-16,17-secogon-4-en-17-ol-3-one and 13-n-propyl-17-methyl-17-phenyl-16,17-secogon-4-en-17 - ol-3-one.

Example 6

A solution of 15 g. of 3-methoxy-16,17-secoestra-2,5(10)-dien-17-ol in 1280 ml. of methanol is treated with 19.5 g. of oxalic acid dissolved in 250 ml. of water. The reaction mixture is kept at room temperature for 45 minutes, diluted with ice water and extracted with methylene chloride.

The organic extracts are washed with sodium bicarbonate solution and water to neutrality, dried over sodium sulfate and evaporated to dryness under vacuo. Crystallization of the residue from acetone-hexane affords 16,17-secoestr-5(10)-en-17-ol-3-one.

By the same method, the following compounds are obtained from their respective 3-methoxy-2,5(10)-diene starting compounds:

13-ethyl-16,17-secogon-5(10)-en-17-ol-3-one,
13-n-propyl-16,17-secogon-5(10)-en-17-ol-3-one,
16,17-secoestr-5(10)-en-3-one,
13-ethyl-16,17-secogon-5(10)-en-3-one,
13-n-propyl-16,17-secogon-5(10)-en-3-one,
17-methyl-16,17-secoestr-5(10)-en-3-one,
13-ethyl-17-methyl-16,17-secogon-5(10)-en-3-one,
17-methyl-17-phenyl-16,17-secoestr-5(10)-en-17-ol-3-one,
13-ethyl-17-methyl-17-phenyl-16,17-secogon-5(10)-en-17-ol-3-one and
13-n-propyl-17-methyl-17-phenyl-16,17-secogon-5(10)-en-17-ol-3-one.

Example 7

A mixture of 1.5 g. of 16,17-secoestr-4-en-17-ol-3-one, 10 ml. of pyridine and 5 ml. of acetic anhydride is kept at room temperature for 18 hours. The mixture is then poured into ice water, and the formed precipitate collected by filtration, washed with water and dried. Crystallization from ether affords 17-acetoxy-16,17-secoestr-4-en-3-one in pure form.

In like manner, using propionic, caproic and cyclopentylpropionic anhydrides as esterifying agents in lieu of acetic anhydride the corresponding 17-propionoxy, 17-caproxy and 17-cyclopentylpropionoxy derivative of 16,17-secoestr-4-en-3-one are obtained.

Example 8

To a cold solution of 1 g. of 16,17-secoestr-4-en-17-ol-3-one in 40 ml. of pyridine is added 6 ml. of heptanoyl chloride and the reaction mixture is allowed to stand for 18 hours at room temperature. The reaction mixture is then concentrated to a small volume under vacuo, diluted with water and extracted with methylene chloride; the organic extracts are washed with water to neutrality, dried over sodium sulfate and evaporated to dryness under reduced pressure. Crystallization of the residue from acetone-hexane gives 17-heptanoyloxy-16,17-secoestr-4-en-3-one.

By the same method, 13-ethyl-16,17-secogon-4-en-17-ol-3-one is converted into the corresponding heptanoate.

Example 9

Two milliliters of dihydropyran are added to a solution of 1 g. of 16,17-secoestr-4-en-17-ol-3-one in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield 17-tetrahydropyran-2'-yloxy-16,17-secoestr-4-en-3-one which is recrystallized from pentane.

By employing the method of the preceding paragraph using dihydrofuran in lieu of dihydropyran, there is prepared the corresponding 17-tetrahydrofuran-2'-yloxy-16,17-secoestr-4-en-3-one product. Similarly, 17-(4'-methoxytetrahydropyran - 4' - yloxy)-16,17-secoestr-4-en-3-one is prepared by utilization of the foregoing procedure employing 4-methoxy-5,6-dihydro-2H-pyran in lieu of dihydropyran.

Example 10

A solution of one chemical equivalent of 16,17-secoestr-4-en-17-ol-3-one in 30 ml. of benzene is heated to reflux and about 2 ml. removed by distillation to eliminate moisture. The mixture is cooled to room temperature and two chemical equivalents of sodium hydride are added, followed by the dropwise addition of two chemical equivalents of cyclopentyl bromide in 10 ml. of benzene over a period of 20 minutes. The mixture is allowed to reflux for 20 hours after which time the precipitate of sodium bromide is removed by filtration and the organic phase dried and evaporated to yield 17-cyclopentyloxy-16,17-secoestr-4-en-3-one which is further purified by recrystallization from pentane.

Alternatively, methyl iodide and ethyl iodide can be used in lieu of cyclopentyl bromide to produce 17-methoxy - 16,17 - secoestr-4-en-3-one and 17 - ethoxy-16,17-secoestr-4-en-3-one respectively.

Likewise, the 17-cyclopentyl, methyl and ethyl ethers of 13-ethyl-16,17-secogon-4-en-17-ol-3-one are obtained.

Example 11

In accordance with the method of Example 2, 5 g. of 3-methoxy-17,17 - dimethyl - 16,17 - secoestra-1,3,5(10)-trien-17-ol is reduced with lithium in liquid ammonia, and the 3 - methoxy-17,17-dimethyl - 16,17-secoestra-2,5(10)-dien-17-ol hydrolyzed with hydrochloric acid or oxalic acid to give the 17,17 - dimethyl-17-hydroxy-16,17-secoestr-4-en-3-one and 17,17-dimethyl-17-hydroxy-16,17-secoestr-5(10)-en-3-one respectively.

A mixture of 1 g. of 17,17-dimethyl-17-hydroxy-16,17-secoestr-4-en-3-one, 2 ml. of acetic anhydride, 5 ml. of acetic acid and 1 g. of p-toluenesulfonic acid is kept at room temperature for 2 hours. The reaction mixture is then diluted with water, extracted with methylene chloride and the organic extracts washed with water, sodium carbonate solution and water to neutrality, dried over sodium sulfate and evaporated to dryness under vacuo. The residue is dissolved in methanol (100 ml.) containing 1 ml. of 5% hydrochloric acid and boiled for 10 minutes. The reaction mixture is neutralized with dilute sodium hydroxide and evaporated to a small volume. Water is added and the product is isolated by extraction with methylene chloride. Crystallization of the residue from acetone-ether gives 17,17-dimethyl-17-acetoxy-16,17-secoestr-4-en-3-one.

By using propionic anhydride and enanthic anhydride in place of acetic anhydride the corresponding propionate and enanthate of 17,17 - dimethyl - 17 - hydroxy - 16,17-secoestr-4-en-3-one are obtained.

Example 12

A solution of 4 g. of 3-methoxy-17-methyl-17-keto 16,17-secoestra-1,3,5(10)-triene in 100 ml. of anhydrous tetrahydrofuran is added in a steady stream under vigorous stirring to 1 lt. of liquid ammonia. An additional amount of tetrahydrofuran is added until the mixture becomes clear, and then 4 g. of lithium wire in small portions are added in a 30 minute period and under stirring. The reaction mixture is stirred for 2 hours further and the blue color discharged by careful addition of methanol. The colorless mixture is allowed to stand at room temperature for several hours to evaporate the ammonia, and then extracted with ethyl acetate. The organic extracts are washed with water to neutral, dried over sodium sulfate and evaporated to dryness under reduced pressure to give 3-methoxy-17-methyl-17-hydroxy-16,17-secoestra-2,5(10)-diene.

The foregoing crude compound is dissolved in 320 ml. of methanol and treated with a solution of 4.8 g. of oxalic acid in 62 ml. of water. The reaction mixture is kept at room temperature for 45 minutes, water is then added and the product extracted with methylene chloride. The combined extracts are washed with water, 5% sodium bicarbonate solution and water to neutrality, dried over sodium sulfate and evaporated to dryness, to yield 17-methyl-17-hydroxy-16,17-secoestr-5(10)-en-3-one, which may be purified by recrystallization from acetone:hexane.

A solution of 1 g. of 17-methyl-17-hydroxy-16,17-secoestr-5(10)-en-3-one in 20 ml. of pyridine is added to a mixture of 1 g. of chromium trioxide in 20 ml. of pyridine. The reaction mixture is allowed to stand at room temperature for 18 hours, and then diluted with ethyl acetate and filtered through Celite, diatomaceous earth, washing the solid with hot ethyl acetate. The combined filtrates are washed well with water, dried over sodium sulfate and evaporated to dryness, thus producing 17 - methyl-16,17-secoestr-5(10)-en-3,17 - dione which is purified by crystallization from acetone-ether.

In a similar manner, starting from 3-methoxy-13-n-propyl-17-methyl-17-keto - 16,17 - secogona - 1,3,5(10)-triene there are obtained successively; 3-methoxy-13-n-propyl-17-methyl-17-hydroxy - 16,17 - secogona-2,5(10)-diene, 13 - n-propyl-17-methyl-17-hydroxy-16,17-secogon-5(10)-en-3-one and 13-n-propyl-17-methyl-16,17-secogon-5(10)-en-3,17-dione.

Example 13

In accordance with the hydrolysis method of Example 2, 1 g. of 3-methoxy-17-methyl-17-hydroxy-16,17-secoestr-2,5(10)-diene is converted into 17-methyl-16,17-secoestr-4-en-17-ol-3-one, which is oxidized with chromium trioxide in pyridine, by following the method of the proceding Example, to yield 17-methyl-16,17-secoestr-4-en-3,17-dione.

Alternatively, the oxidation of the 17-hydroxyl group can be carried out using an 8N chromic acid solution (Jones reagent).

Example 14

By following the method of Example 7, 17-methyl-17-hydroxy - 16,17-secoestr-5(10)-en-3-one, 13-n-propyl-17-methyl-17-hydroxy-16,17-secogon-5(10)-en-3-one and 17-methyl-17-hydroxyl - 16,17 - secoestr-4-en-3-one are converted into the corresponding acetates, propionates, caproates, and cyclopentylpropionates.

Example 15

The method of Example 3 is repeated with the exception of using ethereal ethylmagnesium bromide and n-propylmagnesium bromide as reagents instead of methylmagnesium bromide, to produce 3-methoxy-17-ethyl-16,17-secoestra-1,3,5(10)-trien-17-one and 3-methoxy-17,17-diethyl-16,17-secoestra-1,3,5(10)-trien-17-ol, and 3-methoxy-17-propyl-16,17-secoestra-1,3,5(10)-trien-17-one and 3-methoxy-17,17-dipropyl-16,17 - secoestra-1,3,5(10)-trien-17-ol, respectively.

Example 16

Example 12 is repeated using 3-methoxy-17-ethyl-16,17-secoestra-1,3,5(10)-trien-17-one as starting material, thus producing successively: 3 - methoxy-17-ethyl-17-hydroxy-16,17-secoestra-2,5(10)-diene, 17-ethyl-17-hydroxy-16,17-secoestr-5(10)-en-3-one and 17-ethyl - 16,17 - secoestr-5(10)-en-3,17-dione.

Example 17

A mixture of 5 g. of 14β-estrone-3-methylether, 75 ml. of isopropenyl acetate and 0.8 g. of p-toluenesulfonic acid is heated under reflux for 18 hours using a water separator, at the end of which time the resulting solution is cooled, diluted with ethyl acetate and washed with water, sodium bicarbonate solution and water to neutrality, dried over sodium sulfate and evaporated to dryness under vacuo, to yield 3-methoxy-17-acetoxy-14β-estr-1,3,5(10),16-tetraene which may be purified by crystallization from acetone-ether.

To a solution of 3 g. of 3-methoxy-17-acetoxy-14β-estra-1,3,5(10),16-tetraene in 60 ml. of pyridine are added 4 g. of osmium tetraoxide and the reaction mixture is kept at room temperature for 48 hours, under stirring. Then, 8 g. of sodium bisulfite dissolved in 120 ml. of water and 80 ml. of pyridine are added, and the mixture is stirred at room temperature for 24 hours further. The product is then extracted with ethyl acetate, and the combined organic extracts washed with water to neutral, dried and evaporated to dryness. The residue is purified by t.l.c. eluting the product with hexane-ethyl acetate 75:25 thus producing 3-methoxy-14β-estra-1,3,5(10)-trien-16α-ol-17-one.

A solution of 1.19 g. of 3-methoxy-14β-estra-1,3,5(10)-trien-16α-ol-17-one in 20 ml. of pyridine is treated, at room temperature with 915 mg. (one molar equivalent)

of periodic acid (HIO$_4$·2H$_2$O) dissolved in 10 ml. of water. The reaction mixture is kept at room temperature for 20 hours, and the solvent is then eliminated under reduced pressure, taking care that the temperature is maintained below 30° C. The residue is extracted with ethyl acetate, and the organic extracts are washed with 5% sodium bicarbonate solution, 5% sodium thiosulfate solution and water, dried over sodium sulfate and evaporated to dryness under vacuo, to yield 3-methoxy-16-hydroxy-17-oxa-17α-keto-D-homo-14β-estra-1,3,5(10)-triene, which is used for the next step without further purification.

A solution of the foregoing crude lactol in 20 ml. of methylene chloride is treated with 20 ml. of an ethereal solution of diazomethane, and the mixture is kept at room temperature for one hour. The excess diazomethane is then destroyed by adding a few drops of acetic acid, the solvents are eliminated under vacuo and the residue is purified by t.l.c. to yield 3-methoxy-16,17-seco-14β-estra-1,3,5(10)-trien-16-al-17-oic acid methyl ester.

To a solution of 1 g. of 3-methoxy-16,17-seco-14β-estra-1,3,5(10)-trien-16-al-17-oic acid methyl ester in 5 ml. of ethyl ether are added 0.5 ml. of benzyl mercaptan and three drops of boron trifluoride etherate, and the mixture is kept at room temperature for 20 hours. It is then diluted with ether and the ethereal solution washed to neutral, dried, and evaporated to dryness. The residue is dissolved in 150 ml. of ethanol, 5 g. of Raney nickel are added and the mixture is then refluxed under stirring for 24 hours. The suspension is then filtered through Celite diatomaceous earth, and the nickel is washed well with hot ethanol. The combined filtrate and washings are evaporated to dryness and the residue purified by chromatography on Florisil, thus producing 3-methoxy-16,17-seco-14β-estra-1,3,5(10)-trien-17-oic acid methyl ester.

In a similar manner, starting from 3-methoxy-13-ethyl-142-gona-1,3,5(10)-trien-17-one, there is obtained 3-methoxy - 13-ethyl-16,17-seco-14β-gona-1,3,5(10-trien-17-oic ethyl methyl ester as final product.

3-Methoxy-16,17-seco-14β-estra-1,3,5(10)-trien - 17-oic acid methyl ester and 3-methoxy-13-ethyl-16,17-seco-14β-gona-1,3,5(10)-trien-17-oic acid methyl ester are treated with methylmagnesium bromide in ether-tetrahydrofuran, in accordance with the method of Example 3, to give 3-methoxy-17-methyl-16,17-seco - 14β-estra-1,3,5(10)-trien-17-one and 3-methoxy - 17,17 - dimethyl-16,17-seco-14β-estra-1,3,5(10) - trien-17-ol; and 3-methoxy-13-ethyl-17-methyl-14β-gona-1,3,5(10)-trien-17 - one and 3-methoxy-13-ethyl-17,17-dimethyl-16,17-seco - 14β-gona-1,3,5(10)-trien-17-ol, respectively.

Example 18

In accordance with the reduction method of Example 1, 2 g. of 3-methoxy-16,17-seco-14β-estra-1,3,5(10)-trien-17-oic acid methyl ester is treated with lithium aluminum hydride, to yield 3-methoxy - 16,17 - seco-14β-estra-1,3,5(10)-trien-17-ol.

Likewise, 3-methoxy-13-ethyl - 16,17 - seco-14β-gona-1,3,5(10)-trien-17-oic acid methyl ester is converted into 3 - methoxy-13-ethyl-16,17-seco-14β-gona-1,3,5(10)-trien-17-ol.

Example 19

Example 2 is repeated using 3-methoxy-16,17-seco-14β-estra-1,3,5(10)-trien-17-ol and 3-methoxy-13-ethyl-16,17-seco-14β-gona-1,3,5(10)-trien-17-ol as starting materials thus obtaining respectively 16,17-seco-14β-estr-4-en-17-ol-3-one and 13 - ethyl-16,17-seco-14β-gon-4-en-17-ol-3-one, which are converted into the corresponding acetates by following the method of Example 7, and into the corresponding tetrahydropyranylethers in accordance with the method of Example 9.

Example 20

In accordance with Example 4, 3-methoxy-16,17-seco-14β-estra-1,3,5(10)-trien-17-ol is converted successively into 3-methoxy-16,17-seco-14β-estra-1,3,5(10)-trien-17-al, 3 - methoxy-16,17-seco-14β-estra - 1,3,5(10) - triene, 3-methoxy-16,17-seco-14β - estra-2,5(10)-diene and 16,17-seco-14β-estr-4-en-3-one.

Example 21

Two grams of 3 - methoxy-17,17-dimethyl-16,17-seco-14β-estra-1,3,5(10)-trien-17-ol are reduced with lithium in liquid ammonia, in accordance with the method of Example 2, thus producing 3-methoxy-17,17-dimethyl-16,17-seco-14β-estra-2,5(10)-dien-17-ol.

To a solution of 1.5 g. of 3-methoxy-17,17-dimethyl-16,17 - seco-14β-estra-2,5(10)-dien-17-ol in 130 ml. of methanol is added a solution of 1.95 g. of oxalic acid in 25 ml. of water, and the mixture is kept at room temperature for 50 minutes. It is then diluted with water and extracted with methylene chloride. The organic extracts are washed with sodium bicarbonate solution and water to neutral, dried and evaporated to dryness, to yield 17,17-dimethyl-16,17-seco-14β-estr-5(10)-en-17-ol-3-one.

Example 22

A solution of 5 g. of sodium borohydride in 15 ml. of water is added to an ice-cold solution of 5 g. of 17-methyl - 17-phenyl-16,17-secoestr-5(10)-en-17-ol-3-one in 250 ml. of methanol, and the reaction mixture is allowed to stand at room temperature for 16 hours The excess reagent is decomposed by adding 2.5 ml. of acetic acid, the solution is concentrated to a small volume and diluted with water. The product is isolated by extraction with ethyl acetate and the organic extract is washed with water, dried and evaporated to dryness, thus affording 17-methyl-17-phenyl-16,17-secoestr-5(10)-en-3,17-diol.

A mixture of 2 g. of 17-methyl-17-phenyl-16,17-secoestr-5(10)-en-3,17-diol, 75 ml. of benzene, 10 ml. of acetic anhydride and 0.5 g. of p-toluenesulfonic acid is maintained at room temperature for 2 hours. It is then diluted with water and the organic phase separated, washed with water, sodium carbonate solution and water to neutral, dried and evaporated to dryness under vacuo to yield 3,17 - diacetoxy-17-methyl-17-phenyl-16,17-secoestr-5(10)-ene.

To a solution of 2 g. of 3,17-diacetoxy-17-methyl-17-phenyl-16,17-secoestr-5(10)-ene in 100 ml. of methanol is added a solution of 1 g. of potassium carbonate dissolved in 10 ml. of water, and the mixture is refluxed for 1 hour. The reaction mixture is then poured into water and extracted with methylene chloride, the organic extracts are washed with water to neutral, dried and evaporated to dryness under vacuo, to produce 17-acetoxy-17-methyl-17-phenyl-16,17-secoestr-5(10)-en-3-ol.

Oxidation of the foregoing compound with chromium trioxide-pyridine in accordance with the method of Example 12 affords 17 - acetoxy-17-methyl-17-phenyl-16,17-secoestr-5(10)-en-3-one.

By the same method, 17,17-dimethyl-16,17-secoestr-5(10) - en-17-ol-3-one is converted into the corresponding acetate.

In a similar fashion but using other carboxylic acid anhydrides in place of acetic anhydride, e.g. propionic anhydride, valeric anhydride and caproic anhydride, there are produced the corresponding esters of 17-methyl-17-phenyl - 16,17-secoestr-5(10)-en-17-ol-3-one and 17,17-dimethyl - 16,17 - secoestr-5(10)-en-17-ol-3-one as final products.

Example 23

A solution of 5 g. of 17 - tetrahydropyranyloxy-16,17-secoestr-4-en-3-one in 100 ml. of anhydrous toluene and 50 ml. of anhydrous hexamethylphosphoramide is cooled to —25° C. in a dry-ice acetone bath, 6.5 ml. of methyl iodide are added and to the cooled mixture is added dropwise in a 20 minute period, a previously prepared solution of 2 g. of potassium metal in 50 ml. of t-butanol under stirring and under an atmosphere of nitrogen. The reaction mixture is stirred for 4 hours further at the same temperature, under nitrogen. It is then diluted with water and the solvents eliminated by steam distillation. The product is extracted with methylene chloride and the organic extract washed with water to neutral, dried over sodium sulfate and evaporated to dryness under vacuo. The residue is dissolved in methanol (100 ml.) containing 1 ml. of 5% hydrochloric acid and boiled for 10 minutes. The reaction mixture is neutralized with dilute sodium hydroxide and evaporated to a small volume. Water is added and the product is isolated by extraction with methylene chloride. The residue is purified by chromatography on Florisil, to yield 2,2-dimethyl-17-hydroxy-16,17 - secoestr-4-en-3-one and 2α-methyl-17-hydroxy-16,17-secoestr-4-en-3-one which can be separated by chromatography.

A mixture of 1 g. of 2,2 - dimethyl-17-hydroxy-16,17-secoestr-4-en-3-one, 4 ml. of pyridine and 2 ml. of acetic anhydride is allowed to stand at room temperature for 15 hours. The mixture is then poured into ice water and the solid which forms is collected by filtration, washed with water and dried to yield 2,2-dimethyl-17-acetoxy-16,17 - secoestr-4-en-3-one which may be further purified through recrystallization from acetone:hexane.

Similarly, 2α - methyl-17-acetoxy-16,17-secoestr-4-en-3-one is prepared.

By the same method, the following compounds are prepared from the respective starting compounds:

2,2-dimethyl-16,17-secoestr-4-en-3-one,
2,2-dimethyl-17-methoxy-16,17-secoestr-4-en-3-one,
2,2,17-trimethyl-16,17-secoestr-4-en-3-onê,
2,2-dimethyl-13-ethyl-16,17-secogon-4-en-3-one,
2,2-dimethyl-17-tetrahydropyran-2'-yloxy-16,17-secoestr-4-en-3-one,
2,2,17,17-tetramethyl-17-acetoxy-16,17-secoestra-4-en-3-one,
2,2-dimethyl-17-acetoxy-16,17-seco-14β-estr-4-en-3-one,
2,2-dimethyl-13-ethyl-16,17-seco-14β-gon-4-en-3-one, and
2,2-dimethyl-16,17-seco-14β-estr-4-en-3-one.

Example 24

A mixture of 500 mg. of 2,2-dimethyl-17-acetoxy-16,17-secoestr-4-en-3-one, 15 ml. of anhydrous benzene, 6 ml. of ethyleneglycol distilled over sodium hydroxide and 80 mg. of p-toluenesulfonic acid monohydrate is refluxed for 12 hours using an adapter for the continuous removal of the water formed during the reaction. The reaction mixture is then cooled, aqueous sodium bicarbonate solution is added and the organic phase separated, washed with water, dried over sodium sulfate and evaporated to dryness. The residue is purified by t.l.c. to obtain 2,2-dimethyl-3-ethylenedioxy-17-acetoxy-16,17-secoestr-5(10)-ene in pure form.

A solution of 300 mg. of 2,2-dimethyl-3-ethylenedioxy-17 - acetoxy-16,17-secoestr-5(10)-ene in 60 ml. of methanol is treated with 400 mg. of oxalic acid dissolved in 5 ml. of water. The reaction mixture is kept at room temperature for 45 minutes, diluted with ice water and extracted with methylene chloride. The organic extracts are washed with sodium bicarbonate solution and water to neutrality, dried over sodium sulfate and evaporated to dryness under vacuo. Crystallization of the residue from acetone - hexane affords 2,2 - dimethyl-17-acetoxy-16,17-secoestr-5(10)-en-3-one.

By the same method, 2α-methyl-17-acetoxy-16,17-secoestr - 5(10)-en-3-one, 2,2-dimethyl-16,17-secoestr-5(10)-en - 3 - one, 2α-methyl-16,17-secoestr-5(10)-en-3-one, 2,2,17 - trimethyl - 13 - ethyl-16,17-secogon-5(10)-en-3-one, 2α,17 - dimethyl - 13-ethyl-16,17-secogon-5(10)-en-3-one, 2,2 - dimethyl - 13-ethyl-17-acetoxy-16,17-secogon-5(10)-en - 3 - one, and 2α - methyl - 13-ethyl-17-acetoxy-16,17-secogon - 5(10) - en-3-one are obtained from the corresponding Δ⁴-3-keto isomers.

Example 25

To a solution of 1 g. of 17-acetoxy-16,17-secoestr-4-en-3-one in 28 ml. of anhydrous tetrahydrofuran cooled to —35° C. is added dropwise under an atmosphere of nitrogen, 8 ml. of methyl iodide, and the mixture is stirred for 1.5 hours at —35° to —30° C. The mixture is then treated at the same temperature with a previously prepared mixture of 4 g. of potassium-t-butoxide, 28.5 ml. of anhydrous tetrahydrofuran and 11 ml. of hexamethylphosphoramide. The reaction mixture is stirred at room temperature for an additional hour, diluted with water and extracted with methylene chloride. The combined organic extracts are washed with water to neutral, dried over sodium sulfate and evaporated to dryness. The residue is purified by t.l.c., using hexane-ethyl acetate, 80:20 as gradient to yield 2,2-dimethyl - 17 - acetoxy-16,17-secoestr-4-en-3-one and 2α-methyl-17-acetoxy-16,17-secoestr-4-en-3-one.

17 - Acetoxy-16,17-secoestr-4-en-3-one (200 mg.) in 560 ml. of anhydrous tetrahydrofuran is placed under a nitrogen atmosphere with 113 ml. of methyl iodide. The mixture is maintained at —35° C. (±5°) while a solution of 57 g. of potassium t-butoxide, 570 ml. of tetrahydrofuran, and 140 ml. of hexamethylphosphortriamide is added thereto with stirring over 1.5 hours. The mixture is then allowed to stand at room temperature for one hour after which time it is poured into water and extracted with petroleum ether. The extracts are washed with water and evaporated to dryness in vacuum to give 2,2-dimethyl-17-acetoxy - 16,17 - secoestr-4-en-3-one and 2α-methyl-17-acetoxy-16,17-secoestr-4-en-3-one.

What is claimed is:

1. A compound selected from the group of compounds represented by the formulas:

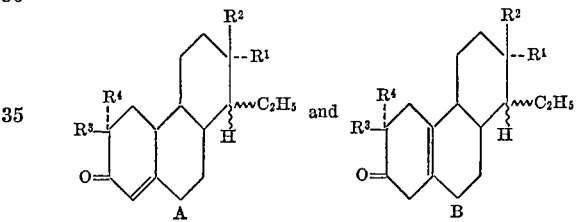

wherein, $R^1$ is a hydroxylated hydrocarbon radical represented by the formulas —CH₂OH     —CH-lower alkyl
                      |
                     OH

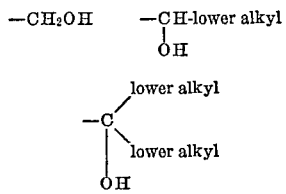

and the hydrolyzable hydrocarbon carboxylic acid esters thereof wherein the carboxylic acid moiety has from 1 to 12 carbon atoms:

$R^2$ is lower alkyl;

$R^3$ and $R^4$ are hydrogen or methyl, provided that $R^4$ is methyl when $R^3$ is methyl.

2. A compound according to Claim 1 wherein the hydrogen atom at C–14 is in α-configuration.

3. A compound according to Claim 1 wherein the hydrogen atom at C–14 is in β-configuration.

4. A compound according to Claim 2 wherein $R^1$ is hydroxymethyl or the esters conventionally hydrolyzable thereof, $R^3$ and $R^4$ are each hydrogen.

5. A compound according to Claim 4 wherein $R^2$ is methyl.

6. A compound according to Claim 2 wherein $R^1$ is the group

lower alkyl and the conventionally hydrolyzable esters thereof, and $R^3$ and $R^4$ are each hydrogen.

7. A compound according to Claim 6 wherein $R^2$ is methyl.

8. A compound according to Claim 2 wherein $R^1$ is the group

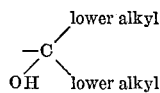

and the conventionally hydrolyzable esters thereof, and $R^3$ and $R^4$ are each hydrogen.

9. A compound according to Claim 8 wherein $R^2$ is methyl.

10. A compound according to Claim 2, formula A, wherein $R^1$ is hydroxymethyl, $R^2$ is methyl, and $R^3$ and $R^4$ are each hydrogen; 17-hydroxy-16,17-secoestr-4-en-3-one.

11. A compound according to Claim 2, formula A, wherein $R^1$ is hydroxymethyl, and $R^2$, $R^3$, and $R^4$ are each methyl; 2,2 - dimethyl-17-hydroxy-16,17-secoestr-4-en-3-one.

12. A compound according to Claim 2, formula A, wherein $R^1$ is acetoxymethyl, $R^2$ is methyl, and $R^3$ and $R^4$ are each hydrogen; 17-acetoxy-16,17-secoestr-4-en-3-one.

13. A compound according to Claim 2, formula A, wherein $R^1$ is heptanoyloxymethyl, $R^2$ is methyl, and $R^3$ and $R^4$ are each hydrogen; 17-heptanoyloxy-16,17-secoestr-4-en-3-one.

14. A compound according to Claim 2, formula A, wherein $R^1$ is the group

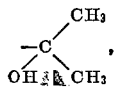

$R^2$ is methyl, and $R^3$ and $R^4$ are each hydrogen; 17-hydroxy-17,17-dimethyl-16,17-secoestr-4-en-3-one.

15. A compound according to Claim 2, formula A, wherein $R^1$ is acetoxymethyl, $R^2$ is methyl, and $R^3$ and $R^4$ are each methyl; 2,2-dimethyl-17-acetoxy-16,17-secoestr-4-en-3-one.

16. A compound according to Claim 2, formula B, wherein $R^1$ is hydroxymethyl, $R^2$ is methyl, and $R^3$ and $R^4$ are each hydrogen; 17-hydroxy-16,17-secoestr-5(10)-en-3-one.

17. A compound according to Claim 2, formula B, wherein $R^1$ is the group

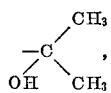

$R^2$ is methyl, and $R^3$ and $R^4$ are each hydrogen; 17-hydroxy-17,17-dimethyl-16,17-secoestr-5(10)-en-3-one.

18. A compound according to Claim 2, formula B, wherein $R^1$ is acetoxymethyl, $R^2$ is methyl, and $R^3$ and $R^4$ are each hydrogen; 17-acetoxy-16,17-secoestr-5(10)-en-3-one.

19. A compound according to Claim 2, formula B, wherein $R^1$ is heptanoyloxymethyl, $R^2$ is methyl, and $R^3$ and $R^4$ are each hydrogen; 17-heptanoyloxy-16,17-secoestr-5(10)-en-3-one.

20. A compound according to Claim 2, formula B, wherein $R^1$ is acetoxymethyl, $R^2$ is methyl, and $R^3$ and $R^4$ are each methyl; 2,2-dimethyl-17-acetoxy-16,17-secoestr-5(10)-en-3-one.

References Cited

UNITED STATES PATENTS

| | | | |
|---|---|---|---|
| 2,830,074 | 4/1958 | Farinacchi | 260—586 H |
| 3,192,257 | 6/1965 | Zderic | 260—586 H |

FOREIGN PATENTS

| | | | |
|---|---|---|---|
| 263,229 | 10/1963 | Australia | 260—586 H |

OTHER REFERENCES

Chem. Abstracts, 61: 14750h–17751b (1964).
Chem. Abstracts, 63: 13348d–13348g (1965).
Chem. Abstracts, 70: 68610Z (1969).
Chem. Abstracts, 67: 91020d–91021 (1967).

VIVIAN GARNER, Primary Examiner

U.S. Cl. X.R.

260—340.9, 343.25, 345.9, 347.8, 410, 468.5, 471 R, 473 F, 473 R, 476 C, 482 R, 484 R, 487, 488 CD, 514.5, 600, 611 F, 612 R, 613 R, 617.5